United States Patent [19]

Saxe

[11] 4,273,422
[45] Jun. 16, 1981

[54] LIGHT VALVE CONTAINING LIQUID SUSPENSION INCLUDING POLYMER STABILIZING SYSTEM

[75] Inventor: Robert L. Saxe, New York, N.Y.

[73] Assignee: Research Frontiers Incorporated, Plainview, N.Y.

[21] Appl. No.: 17,453

[22] Filed: Mar. 5, 1979

Related U.S. Application Data

[60] Continuation-in-part of Ser. No. 932,512, Aug. 10, 1978, Pat. No. 4,164,365, which is a division of Ser. No. 596,198, Jul. 15, 1977, abandoned, which is a continuation-in-part of Ser. No. 476,106, Jun. 3, 1974, abandoned, which is a continuation-in-part of Ser. No. 276,796, Jul. 31, 1972, abandoned.

[51] Int. Cl.³ .......................... G02F 1/00; G02F 1/17
[52] U.S. Cl. ..................................... 350/362; 252/408
[58] Field of Search ............... 252/408; 350/150, 151, 350/362, 356

[56] References Cited

U.S. PATENT DOCUMENTS

| | | | |
|---|---|---|---|
| 1,955,923 | 4/1934 | Land | 350/362 |
| 3,232,903 | 2/1966 | Schmidle et al. | 260/33.6 |
| 3,317,635 | 5/1967 | Osmond | 260/34.2 |
| 3,328,110 | 6/1967 | Berger et al. | 350/362 |
| 3,393,162 | 7/1968 | Cox et al. | 260/33.6 |
| 3,397,166 | 8/1968 | Schmidle et al. | 260/33.6 |
| 3,433,753 | 3/1969 | Farkas et al. | 260/34.2 |
| 3,454,518 | 7/1969 | Kelly | 260/31.4 |
| 3,505,268 | 4/1970 | Backhouse et al. | 260/31.2 |
| 3,512,876 | 5/1970 | Marks | 350/362 |
| 3,532,662 | 1/1970 | Ansdell | 260/34.2 |
| 3,557,007 | 1/1971 | Collins et al. | 260/33.8 R |
| 3,580,880 | 5/1971 | Clarke et al. | 260/34.2 |
| 3,655,267 | 4/1972 | Forlini | 350/362 |
| 3,708,219 | 1/1973 | Forlini et al. | 350/362 |
| 3,723,151 | 3/1973 | Backhouse et al. | 260/34.2 |
| 3,743,382 | 7/1973 | Rosenberg | 350/362 |
| 3,788,996 | 1/1974 | Thompson | 260/34.2 |
| 3,891,572 | 6/1975 | Moody et al. | 252/316 |
| 4,025,163 | 5/1977 | Saxe et al. | 350/362 |
| 4,078,856 | 3/1978 | Thompson et al. | 350/362 |
| 4,113,362 | 9/1978 | Saxe et al. | 350/362 |

*Primary Examiner*—Teddy S. Gron
*Attorney, Agent, or Firm*—Jacobs & Jacobs

[57] ABSTRACT

A light valve for controlling the transmission of radiation, which comprises a cell and a liquid suspension in said cell; said liquid suspension comprising:
  an electrically resistive liquid suspending medium;
  a plurality of small, anisometrically shaped particles suspended in said suspending medium;
  a copolymer of at least two different monomers, at least one of said monomers having a sterically unhindered functional group for bonding to or associating with said particles, and at least one of said monomers having a branched group, the distance from the backbone of the copolymer to said sterically unhindered functional group most distant from the backbone being less than the distance from the backbone to the terminal group of said branched group, the branched groups in said copolymer being sufficiently soluble so that the copolymer as a whole is substantially dissolved in said liquid suspending medium; and
  a polymer dissolved in said liquid suspending medium and bonded to or associated with said copolymer but not said particles; the amount of said copolymer and said associated polymer being at least sufficient to inhibit agglomeration of said particles.

29 Claims, No Drawings

LIGHT VALVE CONTAINING LIQUID SUSPENSION INCLUDING POLYMER STABILIZING SYSTEM

CROSS REFERENCE TO RELATED APPLICATIONS

This is a continuation-in-part of my copending application, Ser. No. 932,512, filed Aug. 10, 1978, entitled Light Valve for Controlling the Transmission of Radiation Comprising a Cell and a Stabilized Liquid Suspension, now U.S. Pat. No. 4,164,365 issued Aug. 14, 1979 which in turn is a divisional of my then copending application, Ser. No. 596,198, filed July 15, 1977, now abandoned, which in turn is a continuation-in-part of my then copending application, Ser. No. 476,106, filed June 3, 1974, now abandoned, which in turn is a continuation-in-part of my then copending application, Ser. No. 276,769, filed July 31, 1972, now abandoned.

This invention relates to light valves, and in particular light valves of the type that include suspensions of small particles therein whose orientation can be changed when an electric field is applied across the suspension. The invention also relates to suspensions for such light valves and to methods of preparing such suspensions.

Light valves including suspensions of small particles capable of having their orientation changed by an electric or magnetic field to change the transmission of light through the suspensions are well known. Examples of such light valves may be found in U.S. Pat. Nos. 1,955,923 (Land) and 1,963,496 (Land).

In light valves of the type described in the abovecited patents, fluid suspensions of herapathite in a suitable liquid have commonly been preferred, although other types of particles have been suggested. In general, the shape of the particles should be such that in one orientation they intercept more light than in another orientation. Particles which are needle-shaped, rod-shaped, lath-shaped, or in the form of thin flakes, have been suggested. The particles may variously be light absorbing or light reflecting, polarizing, birefringent, metallic or non-metallic, etc. In addition to herapathite, many other materials have been suggested such as graphite, mica, garnet red, aluminum, metal halide, periodides of alkaloid acid salts, etc. Preferably dichroic, birefringent or polarizing crystals are employed.

Very finely divided or minute particles are employed, preferably colloidal, and are suspended in a liquid suspending medium, usually with a protective colloid to retard agglomeration or settling. The light valve liquid suspending medium may be virtually any liquid so long as it suspends the small particles and dissolves the polymeric stabilizer. Esters, nitrobenzene, oils and halogenated hydrocarbons have been recommended for use as the liquid suspending medium. See U.S. Pat. Nos. 1,951,644, 2,290,582 and others. Preferably, the liquid suspending medium has a relatively high electrical resistivity and low vapor pressure, and does not degrade or attack the particles or other components of the suspension.

Organic esters useful as all or part of the liquid suspending medium include isopentyl acetate, dioctyl phthalate, diisodecyl adipate, para-nonylphenyl acetate and dioctyl sebacate. Non-solvents for the stabilizing polymer may also be used as part of the suspending medium if they do not cause the polymer to precipitate; it is important that the stabilizing polymer be well dissolved when the suspension is used in a light valve.

A fluid suspension which has been used in the past uses generally needle-shaped particles of herapathite, isopentyl acetate as the liquid suspending medium, and nitrocellulose polymer as a protective colloid. Plasticizing agents such as dibutyl phthalate have also been used in the suspension to increase the viscosity.

Both electric and magnetic fields have been suggested for aligning the particles, although electric fields are more common. To apply an electric field, conductive area electrodes are provided on a pair of oppositely disposed walls of the cell, and an electric potential applied thereto. The electrodes may be thin transparent conductive coatings on the inner sides of the front and rear walls of the cell, thereby forming an ohmic type cell wherein the electrodes are in contact with the fluid suspension. It has also been suggested to cover the electrodes with a thin layer of transparent material such as glass in order to protect the electrodes and suspension from one another. Such thin layers of glass form dielectric layers between the electrodes and the fluid suspension, and the cells may be termed capacitive cells. Direct, alternating and pulsed voltages have been applied to the electrodes in order to align the particles in the fluid suspension. When the voltage is removed, the particles return to a disoriented random condition due to Brownian movement.

Commonly the front and rear walls of the cell are transparent, for example, panels of glass or plastic. With no applied field, and random orientation of the particles, the cell has a low transmission of light and accordingly is in its closed condition. When a field is applied, the particles become aligned and the cell is in its open or light transmitting condition. Instead of making the rear wall transparent, it may be made reflective. In such case light is absorbed when the cell is unenergized and is reflected when the cell is energized. These principal actions may be modified by employing light reflecting rather than light absorbing particles. See also U.S. Pat. No. 4,078,856 for other possible modifications.

In such cells, a serious problem is the agglomeration of the particles. While protective colloids are helpful in reducing or avoiding agglomeration in the stored or inactive condition, when the cell is in use the tendency to agglomerate increases. Depending on the particular suspension employed, and the voltage and frequency used, agglomeration may become noticeable in a matter of seconds, minutes or hours of use. Once agglomeration has occurred, it sometimes tends to remain more or less permanently even though the exciting voltage is removed.

Such agglomeration considerably impairs the usefulness of the light valve since it creates inhomogeneities in the suspension and hence changes the light transmission from point to point. Also, it reduces the ratio of optical density between the closed state and the open state. Further, the density in the closed state may decrease.

Various expedients have previously been proposed to minimize agglomeration of the particles in suspension. For example, Forlini U.S. Pat. No. 3,655,267 proposes the use of a high frequency electrical potential power source to avoid agglomeration. While effective, use of high frequencies involve considerable power consumption in the high frequency power source, and the power source may be quite expensive. Forlini et al U.S. Pat. No. 3,708,219 proposes creating a smooth, generally laminar flow of suspension within the light valve as a means of preventing agglomeration. However, such light valves must be specially constructed to allow such flow to occur and require a means to produce the flow.

The present invention is intended to prevent or retard agglomeration by simple chemical means, rather than the electrical and mechanical means described above. This is accomplished by the provision of a multipolymer system as a replacement for the prior art nitrocellulose protective colloid.

So far as I am aware, the first polymeric system for replacement of nitrocellulose to prevent or retard agglomeration of the particles in a light valve is provided in my earlier mentioned U.S. Pat. No. 4,164,365 that issued out of Ser. No. 932,512. This patent describes a light valve containing a suspension of small particles in an electrically resistive liquid suspending medium and, as the protective colloid, a copolymer of at least two different monomers, at least one of said monomers having a sterically unhindered functional group, and at least one of said monomers having a branched group, the distance from the backbone of the copolymer to said sterically unhindered functional group most distant from the backbone being less than the distance from the backbone to the terminal group of said branched group, the branched groups in said copolymer being sufficiently soluble so that the copolymer as a whole will substantially dissolve in the liquid suspending medium of a light valve suspension. Where the particles contain halogen, the functional groups are hydroxy and/or acidic.

The copolymer described above (hereinafter referred to as "Polymer A") has proven to be effective in minimizing agglomeration of the particles in the light valve suspension. Quite unexpectedly, however, it has been found that a substantial improvement in the anti-agglomerating effect of Polymer A can be obtained when it is used in combination with a second polymer ("Polymer B") that is soluble in the liquid suspending medium and that bonds to or associates with Polymer A, but does not bond to the particles.

Polymer B can be selected so as to be similar (or identical) to one or more monomeric components of Polymer A, in which case Polymers A and B may be associated by London or Van der Waals forces. It is possible to select Polymers A and B so that they are bonded to one another by interaction between complementary functional groups on each other, as by hydrogen bonding or even reaction between suitably chosen groups on Polymers A and B. A typical example of a suitable pair of Polymers A and B is the copolymer of 2-ethylhexyl acryate and acrylic acid as Polymer A and the homopolymer of 2-ethylhexyl acrylate as Polymer B. Polymer A bonds to the particles via the acidic groups, whereas Polymer B is associated only with Polymer A, either by London or Van der Waals interaction or by hydrogen bonding between free acid groups on Polymer A and the ester groups on Polymer B, or more than one such mechanism.

Polymer A may be any of the copolymers described in my earlier-mentioned U.S. Patent. An important property of Polymer A is that the copolymer as a whole is soluble in the light valve liquid suspending medium so that as large a zone of steric protection as possible is formed around a particle to which a chain of Polymer A is bonded. Polymer A can have any structure that fulfills this requirement, and may therefore have, for example, a random, block or graft structure. The functional groups carried by Polymer A bond the polymer to the particles. For example, if the particles have basic groups on their surfaces, acidic groups are desirable functional bonding groups for Polymer A. On the other hand, if the particles have acidic groups on their surfaces, basic functional bonding groups are desirable for Polymer A.

Polymer A preferably is of relatively short chain length and hence of low molecular weight, so as to minimize interparticle bonding. In a light valve, the particles in the suspension must be capable of movement when the electric field is applied to the light valve suspension to orient the particles. In addition, the particles must be capable moving freely within the suspension, e.g. by Brownian movement, in the absence of the electric field. Interparticle bonding restricts this freedom of movement and reduces the change in optical density between the oriented and non-oriented states. Desirably, Polymer A has a chain length of less than about 10,000 Å which is manifested by a molecular weight of less than about 60,000, preferably from about 1,000 to about 50,000. Economically, there is normally no advantage in increasing the molecular weight of a given Polymer A. In some cases, copolymers having a molecular weight in excess of 60,000 can be used if interparticle bonding does not excessively reduce the change in optical density, and if they have some desirable feature, such as low cost, that is offsetting.

The functional groups carried by Polymer A are provided by a copolymerizable monomer containing such groups. Acidic groups are thus provided by using ethylenically unsaturated acids, such as acrylic acid, methacrylic acid, fumaric acid, mesaconic acid, maleic acid or the like, or acrylonitrile and other acidic monomers. Hydroxy groups can be provided by hydroxyalkyl esters of ethylenically unsaturated acids, such as hydroxy propyl acrylate or methacrylate and the like. In a similar fashion, other acidic groups, such as sulfonic acid groups, or basic groups, such a amine or amide groups, and functional groups, such as cyano groups, isocyanato groups and the like are provided by using an appropriately substituted ethylenically unsaturated monomer. As mentioned above, the choice of the functional group is dictated by the nature of the particle, so that adequate bonding without adverse effects on the particle or on the other components of the light valve is obtained.

The branched monomer for Polymer A is selected as described in my U.S. Pat. No. 4,164,365. Preferably, the branched monomer contains no functional groups that bond to the particle. It is also preferable that the branched monomer constitute a majority of the Polymer A by weight and is the monomer of highest molecular weight in Polymer A. Suitable branched monomers include branched alkyl esters of ethylenically unsaturated acids, for example, 2-ethylhexyl acrylate, bis-2-ethylhexyl fumarate, 5,5-diethylhexyl acrylate and 3,5,5-trimethyl hexyl acrylate. However, either or both of the functional group-containing monomer and the branched monomer may be an ether or a cyclic monomer. Particularly useful monomers are halogenated monomers, in particular fluorinated monomers, which aid the copolymer in the attainment of solubility in fluorinated liquids which may be useful suspending media. Typical copolymers useful as Polymer A are described hereinafter.

Polymer B must also be soluble in the liquid suspending medium of the light valve. Polymer B should not include functional groups which would cause it to bond to the suspended particles, although it may contain functional groups that enable it to bond to or associate with Polymer A. Polymer B, like Polymer A, may have any structure that fulfills these requirements, and may therefore, for example, be a homopolymer or a copolymer of the random, block or graft type, and still fall within the scope of the present invention.

Polymer B has a long chain length and high molecular weight. Because Polymer B does not bond to the particles, its long chain length and high molecular weight does not unduly restrict the freedom of movement of the particles for their use in a light valve. The resulting bulkiness of Polymer B, however, is advantageous, since it causes Polymer B to occupy as much space as possible around the particles after Polymer B has bonded or associated with a chain of Polymer A that is in turn bonded to a particle. The objective of this multi-polymer system is to obtain a large zone of steric protection around each particle so as to make it difficult, if not impossible, for the particles to agglomerate, especially when an electric field is applied to the light valve suspension. Having no functional groups on Polymer B that bond to the particles, is also an aid in preventing interparticle bonding, ie., preserving particle discreteness. The long chain length recommended for Polymer B is important because, as is well known, the effective radius in solution of a solvated polymer is proportional to the square root of its extended length. Desirably, Polymer B has a molecular weight greater than about 75,000 and a chain length greater than about 12,000 Å. Preferably, Polymer B has a molecular weight greater than about 100,000, such as from about 100,000 to about 500,000. It has been found that higher molecular weight polymers have a more pronounced antiagglomeration effect and hence Polymer B will generally have as high a molecular weight as possible, but the molecular weight must not be so high as to render Polymer B insoluble in the liquid suspending medium of the light valve. In addition, even when soluble, it is desirable to avoid such high molecular weights for Polymer B that unduly increase the viscosity of the liquid suspending medium, since viscous liquids may undesirably slow down the response time of the particles. It is also preferred that Polymer B comprises at least one branched monomer, since branched monomers appear to provide a better anti-agglomeration effect than straight chain monomers.

Polymer B may be associated with or bonded to Polymer A, depending on the chemical composition of the Polymers. The chemical composition of Polymer A and Polymer B should, of course, be chosen so that no deleterious chemical reaction will occur between or among the materials of the light valve and/or suspension. For example, when the suspended particles are halogen-containing periodide particles, the polymers should not include basic groups, e.g., amine groups therein, to avoid harmful effects on the particles.

Depending upon the nature of Polymers A and B, they can be associated with or bonded to one another in a variety of ways. If the Polymers are similar, as where Polymer B is a polymer of one or more monomers of Polymer A, the attraction will be by London or Van der Waals forces. Polymers A and B can also bond to one another by interaction between functional groups carried by each, such as by hydrogen bonding. More than one attractive mechanism can be present, as described above. In addition to hydrogen bonding, interaction can include acid-base reactions where one Polymer contains acidic groups, such as a carboxylic, sulfonic or phosphoric acid groups and the other Polymer contains a basic group, such as an amine or quaternary ammonium group. Alternatively, the Polymers can contain complementary dipolar groups, such as nitrile, sulfone, nitro, phosphate and sulfonic acid esters and salts, Zwitterions or quaternary ammonium salts. Monomers introducing dipolar groups include acrylonitrile, vinyl methyl sulfone, alkyl esters of vinyl sulfonic acid, dimethyl ester of vinyl phosphate, nitro-substituted aromatic esters of vinyl alcohol, and the like. Typical polymers useful as Polymers A and B are set forth below, with the polymers being grouped together in associated pairs.

| | Polymer "A" | Polymer "B" |
| --- | --- | --- |
| 1. | Poly (2-ethylhexyl acrylate/acrylic acid). | Poly (2-ethylhexyl acrylate). |
| 2. | Poly (2-ethylhexyl acrylate/hydroxyethyl acrylate). | Poly (2-ethylhexyl methacrylate). |
| 3. | Poly (2-ethylhexyl acrylate/hydroxyethyl methacrylate). | Poly (2-ethylhexyl acrylate). |
| 4. | Poly (2-ethylhexyl acrylate/2-hydroxypropyl acrylate/acrylic acid). | Poly (2-ethylhexyl acrylate). |
| 5. | Poly (2-ethylhexyl acrylate/2-hydroxypropyl acrylate/fumaric acid). | Poly (2-ethylhexyl acrylate). |
| 6. | Poly (2-ethylhexyl acrylate/2-hydroxypropyl acrylate/vinylidene chloride/fumaric acid). | Poly (2-ethylhexyl acrylate). |
| 7. | Poly (3,5,5-trimethylhexyl acrylate/2-hydroxypropyl methacrylate). | Poly (3,5,5-trimethyl-hexyl acrylate). |
| 8. | Poly (3,5,5-trimethylhexyl acrylate/2-hydroxypropyl acrylate/fumaric acid). | Poly (3,5,5-trimethyl-hexyl acrylate). |
| 9. | Poly (3,5,5-trimethylhexyl acrylate/2-hydroxypropyl acrylate/di-2-ethylhexyl maleate/fumaric acid). | Poly (3,5,5-trimethyl-hexyl acrylate/di-2-ethylhexyl maleate). |
| 10. | Poly (3,5,5-trimethylhexyl acrylate/2-hydroxypropyl acrylate/di-2-ethylhexyl fumarate/fumaric acid | Poly (3,5,5-trimethyl-hexyl acrylate/di-2-ethylhexyl fumarate). |
| 11. | Poly (3,5,5-trimethylhexyl acrylate/2-hydroxypropyl acrylate/vinylidene chloride/fumaric acid; | Poly (3,5,5-trimethyl-hexyl acrylate). |
| 12. | Poly (5,5-diethyl hexyl acrylate/2-hydroxypropyl acrylate/fumaric acid). | Poly 5,5,-diethyl hexyl acrylate). |
| 13. | Poly (bis-2-ethylhexyl fumarate/2-hydroxypropyl acrylate/acrylonitrile | Poly (bis-2-ethylhexyl fumarate). |
| 14. | Poly (bis-2-ethylhexyl fumarate/3,5,5-trimethyl hexyl acrylate/vinylidene chloride/mesaconic acid). | Poly (bis-2-ethylhexyl fumarate/3,5,5-trimethyl hexyl acrylate). |

The selection of a pair of Polymers A and B will be empirically determined within the parameters set forth above to give optimum results for a given light valve suspension. Usually Polymer A will be present in an amount of from about 0.2% to about 15%, preferably from about 0.5% to about 10%, by weight of the total weight of the light valve liquid suspension, and the ratio of Polymer B to Polymer A will generally be from about 20:1 to about 1:20, preferably from about 10:1 to about 1:10, and most preferably from about 5:1 to about 1:5, but again this is empirically determined to provide an amount of Polymers A and B at least sufficient to inhibit agglomeration of the particles.

Preferably, the light valve particles are light polarizing perhalides of alkaloid acid salts, which are well known in the art. Formation of such particles comprises the reaction of an alkaloid acid salt with a mixture of elemental iodine and a hydrohalide acid or ammonium or metal halide or a mixture thereof, in a suitable solvent, such as an alcohol or ether-alcohol. See U.S. Pat. Nos. 1,951,644, 2,176,516 and 2,289,712. The halide is usually an iodide, but can also be a bromide or chloride. Preferably, the reaction to form the perhalide takes place in the presence of Polymer A. After the light polarizing perhalide particles are formed, they are suspended in the liquid suspending medium. While part of Polymer B can be present during the reaction to form the perhalide particles, it is preferred that all of Polymer B be included in the liquid suspending medium when the perhalide particles are added to the liquid suspending medium.

While in most cases the use of one Polymer A and one Polymer B will be employed, it is within the scope of this invention to employ one or more Polymer A and/or Polymer B.

The present invention is illustrated in terms of preferred embodiments by the following Examples. In this specification and in the accompanying claims, all parts and proportions are by weight unless otherwise stated.

EXAMPLE I

A light valve suspension according to the present invention is prepared as follows.

A. Preparation of Precursor Solution 1.65 Parts of quinine bisulfate are dissolved in 5.0 parts of methanol and 5.0 parts of chloroform with stirring until the solution is a clear water white, and then 4.0 parts of a 45% solids solution of poly (2-ethylhexyl acrylate/acrylic acid) copolymer (95%/5% by weight) dissolved in Cellosolve are added. Molecular weight of the copolymer is approximately 10,000.

B. Preparation of Reactant Solution

An aqueous alcoholic solution of HI is prepared by mixing 0.13 parts of a 47% aqueous solution of HI with 10.0 parts of n-propanol, and then 0.07 parts calcium iodide and 0.05 parts $PrCl_3$ are added to the solution while stirring with a magnetic stirrer. When these solids have completely dissolved, 1.06 parts of $I_2$ crystals and 15.0 parts of dioctyl sebacate are added, and the $I_2$ crystals are dissolved by stirring with a magnetic stirrer for about 20 minutes.

C. Preparation of Light Valve Suspension

The precursor solution prepared in A. is placed in a Waring Blender, which is operated at high speed. The reactant solution prepared in B is added and the reaction mass is mixed with a spatula in the opposite direction of blender flow for about 1 minute. A dark blue paste-like material is removed and spread out on a flat glass plate at a thickness of about eight mils and allowed to dry for at least one hour (or until no odor of volatile solvents can be detected). It is important that the relative humidity in the area where the paste has been prepared, be in the range of 58% to 62%. The temperature should be in the range of 68° to 77° F.

Prior to drying the paste, the following suspending media were prepared:

|  | Suspending Medium | |
| --- | --- | --- |
|  | "X" | "Y" |
| dioctyl sebacate | 40% | 40% |
| n-butyl benzene | 40% | 40% |
| Benzoflex 9-88 SG | 20% | 18% |
| poly (2-ethylhexyl acrylate); molecular weight approximately 124,000 added as a 23% solution in toluene. | — | 2% |

The dried paste is scraped off the plate with a single-edge razor blade and a sufficient amount is added to each suspending medium to give a closed optical density of 1.5 when each suspension is in a light valve cell having a suspension thickness of 2 mils. Each suspension is shaken for almost one minute, then ultrasonically dispersed for at least 15 hours, and then centrifuged for 1 hour to remove large particles. The resulting light valve suspensions are then used to fill test light valve cells.

Identical test cells filled with a light valve suspension based on suspending medium "X" or "Y" were subjected to an electrical field of 3 volts RMS across the suspension for 17 hours, after which time the cells were examined for agglomeration and settling. The cells filled with the light valve suspension employing suspending medium "X" had slight agglomeration and bad settling of the light valve particles, whereas the cells filled with the light valve suspension employing suspending medium "Y" had no agglomeration and slight settling. This demonstrates that the use of the Polymer B improves the anti-agglomeration effect of Polymer A.

Settling occurs when individual particles gradually settle to the bottom of the cell. Agglomeration is a much more severe phenomenom and results when individual light valve particles join together to form clumps that more rapidly settle. Settling without agglomeration is not as severe, and can often be overcome by more closely matching the specific gravity of the particles and Polymers to the specific gravity of the liquid suspending medium. Consequently, the reduction in agglomeration caused by Polymer B is a significant effect.

EXAMPLE 2

The procedure of Example 1 is repeated, except that the copolymer employed is poly (2-ethylhexyl acrylate/acrylic acid) (90%/10%) with a molecular weight of approximately 20,000 and the liquid suspending media were as follows:

|  | Suspending Medium | |
| --- | --- | --- |
|  | "Y-1" | "Y-2" |
| dioctyl sebacate | 24.5% | 24.5% |
| n-butyl benzene | 50.0% | 50.0% |
| Benzoflex 9-88 SG | 24.0% | 24.0% |
| poly(2-ethylhexyl acrylate) | 1.5% | — |
| poly(2-ethylhexyl methacrylate) | — | 1.5% |

The poly (2-ethylhexyl acrylate) is the same as is used in Example 1, but it is added as the dried copolymer. The poly(2-ethylhexyl methacrylate) has a molecular weight of about 100,000, and is also added solvent-free.

After 62 hours at a voltage of 3 volts RMS, test cells containing the light valve suspension employing suspending medium "Y-1" had no agglomeration and no settling, whereas test cells containing the light valve suspension employing suspending medium "Y-2" had no agglomeration but had slight settling. Although both suspensions showed no agglomeration, when Polymer B is based on one of the monomers of Polymer A, Polymers A and B are so similar that the attraction between them is increased thus giving rise to the improved properties of the light valve suspension employing suspending medium Y-1.

EXAMPLE 3

The procedure of Example 1 is followed using poly (3,5,5-trimethylhexyl acrylate/2-hydroxypropyl acrylate/di-2-ethylhexyl maleate/fumaric acid) as Polymer A and poly (3,5,5-trimethylhexyl acrylate/di-2-ethylhexyl maleate as Polymer B with results similar to that obtained using suspending medium Y. The other pairs of Polymers A and B set forth above will provide equivalent results.

I claim:

1. A light valve for controlling the transmission of radiation, which comprises a cell and a liquid suspension in said cell; said liquid suspension comprising:
an electrically resistive liquid suspending medium;
a plurality of small, anisometrically shaped halogen-containing particles suspended in said suspending medium;
a copolymer of at least two different monomers, at least one of said monomers having a sterically unhindered functional group for bonding to or associating with said particles, and at least one of said monomers having a branched group, the distance from the backbone of the copolymer to said sterically unhindered functional group most distant from the backbone being less than the distance from the backbone to the terminal group of said branched group, the branched groups in said copolymer being sufficiently soluble so that the copolymer as a whole is substantially dissolved in said liquid suspending medium; and
a polymer dissolved in said liquid suspending medium and bonded to or associated with said copolymer but not said particles; the amount of said copolymer and said associated polymer being at least sufficient to inhibit agglomeration of said particles.

2. The light valve according to claim 1, wherein said copolymer and said associated polymer bear complementary reactive functional groups.

3. The light valve according to claim 1, wherein said copolymer and said associated polymer bear complementary polar or dipolar groups.

4. The light valve according to claim 1, wherein said associated polymer is of a similar nature to that of said copolymer and is associated therewith at least in part by London or Van der Waal attraction.

5. The light valve according to claim 4, wherein said associated polymer is a polymer of at least one monomer of which said copolymer is comprised.

6. The light valve according to claim 1, wherein said copolymer and said associated polymer have at least one monomer in common.

7. The light valve according to claim 1, wherein said copolymer is present in an amount of from about 0.2% to about 15% by weight, based on the total weight of said liquid suspension, and the ratio of said copolymer to said associated polymer is from about 20:1 to about 1:20.

8. The light valve according to claim 7, wherein said amount of said copolymer is from about 0.5 to about 10% and said ratio is from about 10:1 to about 1:10.

9. The light valve according to claim 1, wherein said copolymer has a molecular weight of less than about 60,000 and said associated polymer has a molecular weight of more than about 100,000.

10. The light valve according to claim 1, wherein said copolymer has a molecular weight of from about 1,000 to about 50,000 and said associated polymer has a molecular weight of from about 100,000 to about 500,000.

11. The light valve according to claim 1, wherein said associated polymer comprises a polymerized branched monomer.

12. The light valve according to claim 1, wherein said functional group is a hydroxy or acidic group.

13. The light valve according to claim 12, wherein said monomer containing said functional group comprises a hydroxyalkyl ester and said associated polymer comprises a poly(alkyl ester).

14. The light valve according to claim 13, wherein said hydroxyalkyl ester is a hydroxyalkyl acrylate or methacrylate, and said associated polymer comprises a polyacrylate or polymethacrylate.

15. The light valve according to claim 12, wherein said monomer containing said functional group comprises a polybasic acid.

16. The light valve according to claim 1, wherein at least one of said copolymer and said associated polymer comprise polymerized units of a branched halogenated monomer.

17. The light valve according to claim 16, wherein said halogenated monomer is a fluorinated monomer.

18. The light valve according to claim 1, wherein said monomer containing said branched group is an ether.

19. The light valve according to claim 1, wherein said associated polymer is a homopolymer or a random, alternating, block or graft copolymer, and said copolymer is a random, alternating, block or graft copolymer.

20. The light valve of claim 1, wherein said copolymer and said associated polymer comprise polymerized units of a branched monomer having a plurality of branches.

21. The light valve of claim 20, wherein said branched monomer constitutes more than 50%, by weight, of said copolymer.

22. The light valve of claim 21, wherein said branched monomer has a higher molecular weight than the other monomers of said copolymer.

23. The light valve of claim 20, wherein said branched monomer is a fluorinated monomer.

24. The light valve according to claim 1, wherein the liquid suspending medium is non-aqueous.

25. The light valve according to claim 24, wherein the liquid suspending medium is a non-polar ether.

26. The light valve of claim 24, wherein the liquid suspending medium is a halogenated liquid.

27. The light valve of claim 26, wherein the halogenated liquid is selected from the group consisting of fluorinated alkanes, fluorinated esters and fluorinated ethers.

28. The light valve according to claim 1, wherein said particles are of a light polarizing perhalide of an alkaloid acid salt.

29. The light valve according to claim 28, wherein said copolymer is poly (2-ethylhexyl acrylate/acrylic acid), poly (2-ethylhexyl acrylate/hydroxyethyl acrylate), poly(2-ethylhexyl acrylate/hydroxyethyl methacrylate), poly(2-ethylhexyl acrylate/2-hydroxypropyl acrylate/acrylic acid), poly (2-ethylhexyl acrylate/2-hydroxypropyl acrylate/fumaric acid), poly (2-ethylhexyl acrylate/2-hydroxypropyl acrylate/vinylidene chloride/fumaric acid), poly (3,5,5-trimethylhexyl acrylate/2-hydroxypropyl methacrylate), poly (3,5,5-trimethylhexyl acrylate/2-hydroxypropyl acrylate/fumaric acid), poly (3,5,5-trimethylhexyl acrylate/2-hydroxypropyl acrylate/di-2-ethylhexyl maleate/fumaric acid), poly (3,5,5-trimethylhexyl acrylate/2-hydroxypropyl acrylate/di-2-ethylhexyl fumarate/fumaric acid, poly (3,5,5-trimethylhexyl acrylate/2-hydroxypropyl acrylate/vinylidene chloride/fumaric acid; poly (5,5-diethyl hexyl acrylate/2-hydroxypropyl acrylate/fumaric acid), poly (bis-2-ethylhexyl fumarate/2-hydroxypropyl acrylate/acrylonitrile, or poly (bis-2-ethylhexyl fumarate/3,5,5-trimethyl hexyl acrylate/vinylidene chloride/mesaconcic acid) and said associated polymer is poly (2-ethylhexyl acrylate), poly (3,5,5-trimethylhexylacrylate), poly (3,5,5-trimethylhexyl acrylate/di-2-ethylhexyl maleate), poly (3,5,5-trimethylhexyl acrylate/di-2-ethylhexyl fumarate), poly (5,5-diethyl hexyl acrylate), poly (bis-2-ethylhexyl fumarate), or poly (bis-2-ethylhexyl fumarate/3,5,5-trimethyl hexyl acrylate).

* * * * *